United States Patent Office 3,518,207
Patented June 30, 1970

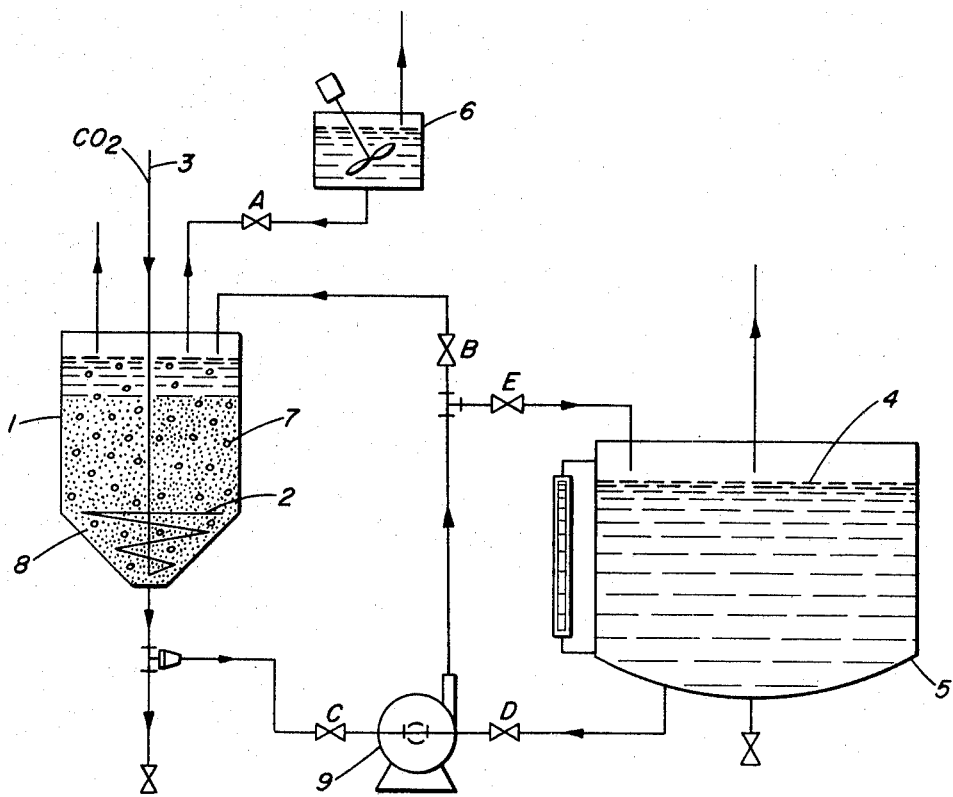

3,518,207
IMPREGNATION PROCESS FOR PLATINUM-ALUMINA CATALYST AND CATALYST PRODUCED THEREBY
Robert W. Hagy and Zebulon V. Morgan, Marietta, Ohio, and Robert L. Northcraft, Pennsboro, W. Va., assignors to American Cyanamid Company, Stamford, Conn., a corporation of Maine
Filed Oct. 30, 1967, Ser. No. 679,036
Int. Cl. B01j *11/08*
U.S. Cl. 252—466      3 Claims

ABSTRACT OF THE DISCLOSURE

This invention relates to a process for preparing platinum-alumina reforming catalyst of improved activity having platinum uniformly distributed therein which comprises continuously contacting calcined formed particles of alumina with a carbon dioxide saturated platinum-containing solution. In the practice of the invention the continuous contacting of said formed particles is carried out by continuously feeding gaseous carbon dioxide into a platinum containing solution while said platinum-containing solution is being continuously recirculated through a bed of formed alumina particles.

---

The invention relates to a process for preparing platinum-alumina reforming catalysts characterized by having platinum uniformly distributed therein.

Platinum catalysts are used by the petroleum industry to upgrade virgin naphthas for the production of motor fuels and for the production or aromatic hydrocarbons. A usually preferred naphtha feed is a 200–450° F. cut of mid-continent crude, although naphthas from Texas, California and Kuwait or other crudes may be used. Mid-continent crudes are quite plentiful and contain large amounts of naphthenes, as for example, about 40%. These naphthenes are convertible to corresponding aromatics by dehydrogenation under reforming conditions. Other reactions which normally take place in reforming are hydrocracking of paraffins, isomerization of paraffins, and dehydrocyclization of paraffins to aromatics. In a typical reforming run a mid-continent crude naphtha having an unleaded octane rating of 35–40 units is converted to a motor fuel which has as octane rating of 85–100 units.

The art of manufacturing platinum reforming catalysts is highly developed and numerous methods and procedures have been described for the manufacture of such catalysts.

A substantial problem in the preparation of platinum-alumina catalyst, especially catalyst compositions prepared by the impregnation of solid particulate or formed alumina particles, is the achievement of uniform distribution of the platinum within the alumina structure. It has long been recognized that uniform distribution of platinum is important to the efficient utilization of this costly catalytic promoter. Thus, such distribution is important to expose as great an area of platinum surface as possible, to make full use of the alumina support and to protect the platinum against loss by attrition.

Typical of the prior patent literature concerned with procedures for achieving uniform distribution of platinum in platinum-alumina reforming catalyst are U.S. Pats. 2,840,514; 2,840,532 and 2,884,382.

The first two of the above-identified patents are concerned with the addition of various salts as impregnating aids to a platinum-containing solution to assist in obtaining more uniform impregnation. Typical to such impregnating aids are various aluminum salts such as aluminum chloride, aluminum nitrate and the like. With regard to the latter patent, the invention therein disclosed and claimed comprises pretreating a porous alumina support material, while in the dry state with gaseous carbon dioxide in such a manner that all of the air in the pores of alumina is replaced by the gaseous carbon dioxide. Thereafter, while maintaining the thus treated alumina out of contact with air, the alumina is impregnated with a platinum solution and the resulting material dried and calcined.

The times required to achieve improved or enhanced impregnation in accordance with U.S. Pat. 2,884,382 are substantial, most of the examples describing pretreatments with gaseous carbon dioxide for 30 or more minutes and then while the alumina is in contact with the gaseous carbon dioxide and out of contact with the air, the alumina is impregnated with a platinum solution such as chloroplatinic acid is carried on for substantial periods of time, typically 24 hours or more at room temperature.

Of the methods employed to achieve more uniform distribution of platinum in the alumina particles that described in U.S. Pat. 2,884,382 is most closely related to that of the present invention. While the method of obtaining uniform impregnating of platinum described in U.S. Pat. 2,884,382 has demonstrated merit, it is time-consuming and therefore costly, does not consistently achieve a high degree of uniform impregnation, nor does it lend itself to large scale commercial production.

Accordingly, it is an object of the present invention to provide a process for preparing platinum-alumina reforming catalysts of improved activity and characterized by the presence of platinum uniformly and evenly distributed throughout formed alumina particles.

It is a further object of the present invention to provide an improved process for the preparation of such catalysts capable of adoption to large scale commercial production.

Specifically, it is an object of the present invention to provide a process whereby good "pellet-to-pellet" impregnation of the formed alumina particles with platinum is achieved, as well as complete and uniform impregnation of such alumina particles.

These and other objects of the present invention will become more apparent from the detailed description thereof set forth hereinbelow and in the accompanying drawing in which apparatus suitable for use in the impregnation procedure may be employed.

In accordance with the present invention, a process is provided for preparing a platinum-alumina reforming catalyst of improved activity having platinum uniformly distributed therein which comprises continuously contacting calcined formed particles of alumina with a carbon dioxide saturated platinum containing solution. The continuous contacting of said formed particles is effected by continuously feeding gaseous carbon dioxide into a platinum containing solution in which the formed alumina particles are immersed, while the solution is being continuously recirculated through the formed particles. The continuous recirculation of the carbon dioxide saturated platinum solution is continued until platinum is added to said aluminum particles in the desired amount, normally an amount between about .01 and about 1% by weight based on the dry weight of the alumina. After impregnation, the formed compositions are calcined.

The calcined formed alumina particles may be pieces of any suitable size and shape such as cylindrical pellets, spherical beads, extrudates, rings, saddles and the like. Although alumina from any source may be employed we desire to use either a sol-type alumina, prepared by gelling and drying an aqueous alumina sol or precipitated alumina obtained by neutralizing, as with ammonium hydroxide, an aqueous alkali metal aluminate or aluminum salt solution, and washing and drying the resulting aluminum hydroxide. Alumina from these sources is preferred because it produces gamma-alumina when calcined at temperatures within the range of 1000–1500° F., but it will be understood that the principles of our invention may be applied to alumina of other types.

Preferably, the alumina is the sol-type alumina prepared in accordance with U.S. Pat. 2,258,099 or reissue Pat. No. Re. 22,196.

In the preparation of calcined formed alumina from such sol, aluminum pellets, mercury and acetic acid are mixed at a temperature of from 50 to 90° C. and after sol formation, the sol is gelled by the addition of a basic material such as ammonia. The thus formed gel is normally dried, milled and formed as by extruding, after which the extrudates are calcined prior to impregnation in accordance with the present invention.

The platinum solution or platinum containing solution may be prepared with any of a number of platinum compounds known to those skilled in the art to be useful for this purpose. Thus, chloroplatinic acid, platinumtetrachloride or their equivalence may be employed with chloroplatinic acid being preferred.

The platinum content of the impregnating solution should be sufficient to incorporate in the alumina from between .01 and 1% by weight of platinum based on the dry weight of the alumina, though preferably the amount will be sufficient to impart from between .1 and .8% by weight on the same basis.

It is generally known that the presence of halogen, usually chlorine or fluorine, in a platinum-alumina reforming catalyst, does, within certain limits, improve the activity of the catalyst. The presence of halogen in a platinum reforming catalyst may be achieved as an incident to the manufacture of the alumina base material, or alternatively, it may be incorporated by the addition of a halogen-containing compound to a suitable alumina base material simultaneously with the addition of the platinum compound to the support or base material or before or after the addition of platinum to said material. The addition with a platinum-containing compound may occur by employing such platinum containing compounds as chloroplatinic acid, which function both as a source of halogen and of platinum in the final catalyst material or by including with the platinum containing solution a further source of halogen.

It is an important feature of the present invention that gaseous carbon dioxide be continuously fed to the circulating platinum-containing solution in which the formed alumina particles are immersed, in a manner that will ensure continuous and complete saturation of the solution with the said gaseous carbon dioxide. Saturation can be determined visually through the presence of bubbles at the surface of the impregnating solution. It is important that the gaseous carbon dioxide be continuously fed to the circulating solution to maintain saturation, since carbon dioxide is constantly purged from the system due to the exotherm of the reaction between the platinum containing solution and the alumina plus the fact that the continuous recirculation of the platinum containing solution tends to release carbon dioxide.

In addition to maintaining the recirculating platinum containing solution saturated with gaseous carbon dioxide, it has been found to be highly preferred and desirable that the gaseous carbon dioxide be distributed uniformly throughout an impregnating solution. Thus, it has been determined that more rapid and uniform impregnation is achieved if the gaseous carbon dioxide is continuously fed from a large number of ports or openings adjacent the bottom of the immersed calcined formed alumina particles as compared with entering into the impregnating solution from but a single source. As will be seen hereinafter, and in the accompanying drawing rapid and complete distribution of the gaseous carbon dioxide may conveniently be achieved by employing a sparger-type arrangement at the bottom of an impregnating container.

In addition to maintaining the platinum solution saturated with gaseous carbon dioxide, it is a critical aspect of the present invention that the platinum solution be containuously recirculated through the bed of calcined formed alumina particles. The combination of continuous recirculation of the platinum containing solution while continuously maintaining said solution saturated with carbon dioxide are the two principal features of the present invention whereby its objectives are achieved. Continuous recirculation as will be seen in the accompanying drawing is conveniently achieved by the platinum solution entering an impregnating tank from the top and is withdrawn from the bottom and continuously recirculated from top to bottom.

In practice, an excellent way of carrying out the present invention and a preferred method is to continuously recirculate the impregnating solution against a uniform infusion of gaseous carbon dioxide. Thus, in simplest terms, the impregnating solution proceeds from top to bottom where it is withdrawn and recirculated whereas the gaseous carbon dioxide is preferably proceeding from bottom to top of such a container. This countercurrent of the platinum solution and carbon dioxide greatly facilitates the impregnation of the formed catalyst particles.

In order to further exemplify the present invention, reference is made to the accompanying drawing in which 1 represents an impregnation tank having a capacity of 110 gallons, containing a sparger or cone shaped carbon dioxide source 2 positioned in the cone shaped bottom thereof and connected with a carbon dioxide source 3. In operating the exemplified system 60 gallons of demineralized water 4 from holding tank 5 is fed to impregnation tank 1 through valves D and B after which 5 gallons of a chloroplatinic acid solution containing 1.96% of platinum by weight and 374 gm. $AlCl_3·6H_2O$ is fed from tank 6 to the demineralized water. The demineralized water and platinum solutions are mixed and gaseous carbon dioxide is fed from carbon dioxide source (not shown) through line 3 to sparger 2 to saturate with carbon dioxide 7 the impregnating solution, i.e., the demineralized water-chloroplatinic acid mixture.

As indicated above sparger 2 is cone shaped, constituted by a series of concentric circles of a tubing material, such as polyethylene or polyvinyl chloride typically of rounded cross section, the smallest circle of which would be at the bottom of the cone and in contact with carbon dioxide source line 3. Each circle will have a number of perforations along its surface, whereby gaseous carbon dioxide may be dispersed uniformly upwardly through the platinum solution throughout the entire solution.

To the carbon dioxide saturated impregnated mixture is added 200 pounds of $\frac{1}{16}''$ calcined alumina extrudates 8 having an average length of 4–7 mm., a surface area of 160–220 m.$^2$/gm., and a pore volume of .5–.7 ml./gm.

Simultaneously with the introduction of the extrudates 8 circulation of the carbon dioxide saturated platinum solution is commenced through the bottom of impregnator 1 through line C by means of circulating pump 9, through line B and back into impregnator 1. Circulation of the platinum solution at steady state is preferably such that the volume of impregnator 1 is completely recirculated every .8 minute. During steady state operations gaseous carbon dioxide is continuously fed to the platinum solution in the manner indicated so as to continuously maintain the platinum solution saturated with carbon dioxide. It will be seen that while in operation the carbon dioxide is bubbled against or countercurrent to the recirculating flow of the platinum solution.

Normally, impregnation in the above manner is complete in about 1 hour and will result in a volume impregnation determination of about 100%.

In the above exemplification, the final catalyst will contain .42% platinum and .6% chloride, the balance being essentially alumina.

When the impregnation step is complete the impregnated catalysts are removed through the bottom of impregnator 1, dried and calcined to form the final product. The solution from which the platinum and chloride content is substantially exhausted is delivered to a storage tank facility for recovery of accumulated trace amounts of platinum.

In order to illustrate the present invention, the following examples are given primarily by way of illustration. No specific details or enumerations contained therein should be construed as limitations on the present invention, except insofar as they appear in the appended claims. All parts and percentages are by weight unless otherwise specifically designated.

In the following examples a volume impregnation determination procedure is employed, to determine the percent of platinum impregnation. In this procedure the impregnated formed alumina particles are heated to reduce the platinum to metallic gray and the percent of platinum impregnation is measured by means of microscopic examination. In carrying out this procedure, formed catalyst with reduced platinum is broken in two pieces, one piece being discarded, the other being saved for measurement. The broken piece is placed under a microscope, having a lens containing a graduated scale, and examined for platinum penetration. The diameter of the catalyst ($D_1$) is recorded and the diameter of the unplatinized core ($D_2$) is also recorded. The volume impregnation is then determined employing the following equation:

$$\frac{\pi\left(\frac{D_1}{2}\right)^2 - \pi\left(\frac{D_2}{2}\right)^2}{\pi\left(\frac{D_1}{2}\right)^2} \times 100 = \text{Percent volume impregnation}$$

Pore volume values and surface area reported in the following examples are determined in accordance with the manual Test Methods for Synthetic Fluid Cracking Catalyst Revised Edition, published by American Cyanamid Company, New York, N.Y. 1957 unless otherwise specified.

EXAMPLE 1

Aluminum pellets, mercury and acetic acid are entered into a suitable reaction vessel at a temperature of between about 70 and 90° C. until a sol solution is formed.

Thereafter the alumina sol is gelled by the addition of an amount of ammonia that produces a pH in the mixture of between 5.5 and 6.7. The thus formed alumina gel is placed on trays and dried at 220° C.–250° C. for up to 24 hours.

Thereafter the dried gel is micropulversized to produce a product having from 50 to 100% of the particles finer than 325 mesh and an apparent bulk density of about 37.

About two parts of the milled, dried gel is then blended with one part of fresh alumina sol and the resulting mixture extruded, dried at room temperature and then at 200° C.–250° C., after which it is calcined for 1 hour at 1100° F. The calcined alumina had a pore volume of .66 g./cc. and a surface area of 190 m.$^2$/gm.

One pound batches of alumina prepared in the above manner were employed to study the use of carbon dioxide as an impregnating aid.

Experiment A

Into 820 ml. of distilled water in a suitable container was placed 3.317 gms. of chloroplatinic acid (40% chloroplatinic acid) and 4 gms. of aluminum chloride. The container was equipped with a recirculation line whereby the platinizing solution could be continuously recirculated at a rate of 4 liters per minute (l.p.m.)

The container was equipped with a cone shaped polyvinyl chloride tube of the type described in connection with the accompanying drawing characterized by a plurality of openings so as to function as sparger at the base of the impregnating container. The sparger was connected to a gaseous carbon dioxide source through which gaseous carbon dioxide was continuously fed at a rate of 4 l.p.m. for 10 minutes until the platinum solution was saturated and the upper surface of the platinum solution bubbled strongly.

Into the thus prepared impregnating solution was placed one pound of the preformed calcined extrudates described hereinabove. After the addition of the extrudates the platinum solution was continuously withdrawn and recirculated through the bottom of the impregnating container at a rate of 4 l.p.m. against the flow of gaseous carbon dioxide which was bubbled into impregnating container at the bottom thereof at a rate of 4 l.p.m., a rate more than sufficient to maintain the platinum impregnating solution saturated. The recirculation rate was such that the total gallonage of the impregnator was completely recycled every .2 minute.

The above impregnating procedure was carried out for a 1 hour period.

The thus impregnated extrudates were then withdrawn from the impregnating container, dried at 220° C.–250° C. and calcined at 1100° F.

The catalyst contained .3% platinum and .6% chloride based on the total weight of the composition.

Employing the volume impregnation determination procedure described above, catalyst so impregnated were determined to have an average volume impregnation expressed as a percent of 100.

Experiment B

The same procedure was employed as in Experiment A above with the exception that no carbon dioxide was employed either to initially saturate the platinum solution, nor was any employed during the one hour impregnation time.

The catalyst contained .3% platinum and .6% chloride based on the total weight of the composition and the balance alumina. The average volume impregnation expressed as a percent was 67.4.

Experiment C

The same procedure was employed as was employed in Experiment B, except that 820 ml. of carbonated water was substituted for 820 ml. of distilled water.

The catalyst contained .3% platinum and .6% chloride based on the total weight of the composition and the balance alumina. The average volume impregnation expressed as a percent was 90.3.

The average volume impregnation expressed as a percent clearly demonstrates that Experiment A results in superior impregnation when compared to those achieved employing procedures of B and C.

EXAMPLE 2

In equipment similar to that referred in Experiment A and the accompanying drawing above, a number of experiments were conducted to demonstrate the importance of the method of adding the carbon dioxide to the impregnating platinizing solution.

Experiment D

Employing the equipment and materials described in Experiment A hereinabove with the exception that the gaseous carbon dioxide was introduced at the bottom of the impregnating solution from a single opening or pipe at the bottom of the cone of the impregnating tank of the type illustrated in the drawing, as distinguished from the sparger there described. Employing this method of introducing carbon dioxide the platinum solution was continuously recirculated against the single stream or flow of carbon dioxide for 1 hour. Catalyst so impregnated, contained .3% platinum, .6% chloride and the balance alumina.

The final catalyst demonstrated only a 65% volume impregnation.

Experiment E

Carbon dioxide was introduced into the pellet containing impregnator through a single pipe located in the center of the cone. Holes were drilled in the bottom end of the pipe located just above the cone surface. The carbon dioxide was not dispersed to the edge of the cone.

The catalyst contained .3% platinum and .6% chloride.

Employing otherwise the same equipment and starting materials, a volume impregnation of 80% was obtained by this technique.

Experiment F

A 20' coil of polyvinyl chloride ½" in diameter was fabricated so as to fit into the bottom of the impregnating cone. Holes were drilled at 6" intervals. Carbon dioxide was introduced at the bottom of the coil.

This method resulted in good distribution of the carbon dioxide through the catalyst bed and the volume impregnation by this method was 97%.

Experiment G

Alumina extrudates prepared as in Example 1 were pretreated with gaseous carbon dioxide before impregnation by taking a drum of extrudates and passing gaseous carbon dioxide through them for 3 hours to displace the entrained air with carbon dioxide.

The catalyst was then impregnated by method F.

The volume impregnation was 96%. It thus appears there is no advantage in a dry pretreatment with carbon dioxide prior to platinization by the procedure of the present invention.

Experiment H

The same procedure was employed in this experiment as in Experiment A above except the impregnations were carried out in the pilot plant equipment shown in the attached drawing. The percentage of platinum by weight in the chloroplatinic acid solution was varied to give a finished catalyst of 0.5, 0.6, and 0.74% platinum. No aluminum chloride was employed. No halogen was employed in the impregnations except the chloride in the chloroplatinic acid used. The size of the extrudates used were ⅟₁₆ and ⅟₁₂ inch diameter. The following data were obtained:

| Final product | | Extrudate diameter | Percent volume impregnation |
|---|---|---|---|
| Percent Pt | Percent Cl | | |
| .5 | .5 | 1/16 | 97.0 |
| .6 | .6 | 1/16 | 98.6 |
| .6 | .6 | 1/12 | 97.0 |
| .74 | .74 | 1/12 | 97.4 |

It is evident from the above data that the improved results achieved by the process of this invention are independent of the process of aluminum chloride.

The rate of recycle and a concentration of chloroplatinic acid solution are meaningful factors controlling the distribution of the platinum on the catalyst support or base. The rate of recycle normally will be controlled by a pump and should remain constant. The concentration of the chloroplatinic acid solution can be readily regulated by varying the volume of the solution used.

The time required for the platinum to be absorbed by the base changes with the platinum concentration. Thus, the higher the platinum level, the longer the time required for the platinum to be absorbed. For example, at a platinum level of .4% the chloroplatinic acid solution should recycle through the entire catalyst bed once every .8 minute and for a .7% platinum catalyst, a complete recycle should be completed every 1.2 minutes.

In this connection, a number of experiments were carried out illustrating the importance of controlling the time required to circulate the chloroplatinic acid solution through the catalyst bed by comparing recycle rates against platinum distribution. (The variation in platinum content from top to bottom of the impregnator.)

The extrudates employed were the same as those described in Example 1 hereinabove.

| Platinum (percent) | Time (minutes) per complete recycle | Platinum distribution (1%), percent |
|---|---|---|
| 0.60 | 0.7 | ±12.7 |
| 0.60 | 0.9 | ±9.7 |
| 0.60 | 1.1 | ±1.1 |
| 0.60 | 2.6 | ±7.0 |
| 0.74 | 1.0 | ±8.0 |
| 0.74 | 1.1 | ±6.9 |
| 0.74 | 1.2 | ±2.2 |

NOTE.—A baseline usage of 0.0025 cubic feet per minute per pound of catalyst.

The above table points out the significance of regulating recycle time to obtain optimum platinum distribution of finished product. Optimum recycle time varies with different platinum levels of finished product and is controlled by varying volume of chloroplatinic acid solution.

We claim:

1. The process for preparing a platinum-alumina reforming catalyst of improved activity having platinum uniformity distributed therein, which comprises continuously contacting calcined formed particles of alumina with a carbon dioxide saturated platinum impregnating solution, continuously maintaining said solution carbon dioxide saturated by continuously feeding gaseous carbon dioxide into said impregnating solution, continuously recirculating said carbon dioxide saturated impregnating solution through the bed of formed alumina particles whereby platinum is added to said alumina particles in an amount between about 0.01 and 1% by weight, based on the dry weight of the alumina and thereafter calcining the resulting composition.

2. A process according to claim 1 in which the gaseous carbon dioxide is continuously and uniformly bubbled up through a bed of formed alumina particles immersed in a platinum-containing impregnating solution, while said impregnating solution is being simultaneously continuously drawn downwardly through said particles and recirculated.

3. A process according to claim 1 in which the continuously circulated carbon dioxide saturated platinum-containing impregnating solution is a carbon dioxide saturated chloroplatinic acid solution and is continuously and rapidly withdrawn through a bed of formed catalyst particles in a direction countercurrent to a continuous flow of carbon dioxide gas bubbles said continuous flow of carbon dioxide gas bubbles being sufficient to maintain the impregnating solution saturated with carbon dioxide.

References Cited

UNITED STATES PATENTS 2,884,382  4/1959  Oleck _____ 252—442
3,152,092  9/1964  Cornelius _____ 252—466

DANIEL E. WYMAN, Primary Examiner

P. M. FRENCH, Assistant Examiner